Feb. 6, 1962 L. N. ADKINS 3,019,531
SCALE REDUCING DEVICE FOR SIGHTING INSTRUMENTS
Filed Nov. 7, 1958 2 Sheets-Sheet 1
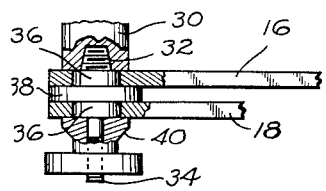
Fig. 4.
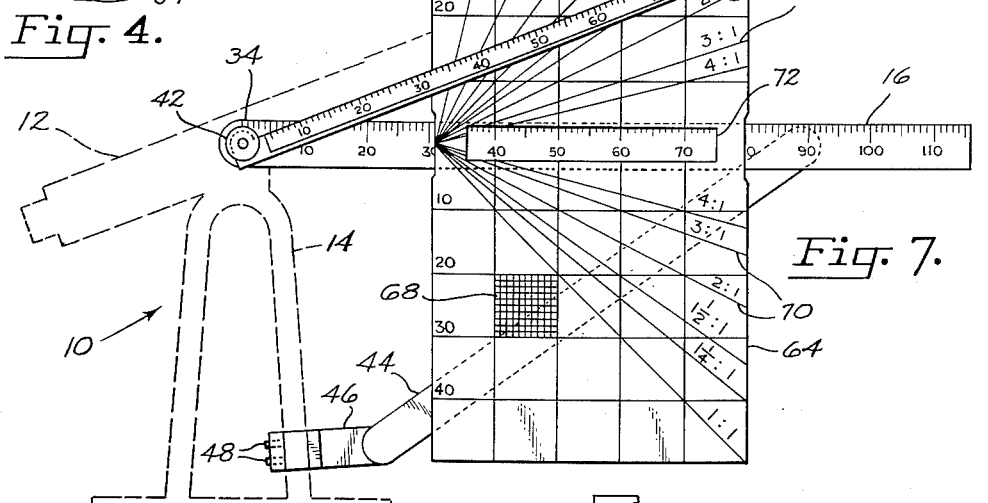
Fig. 7.
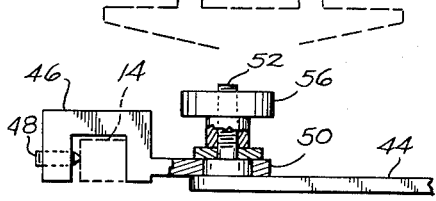
Fig. 3.
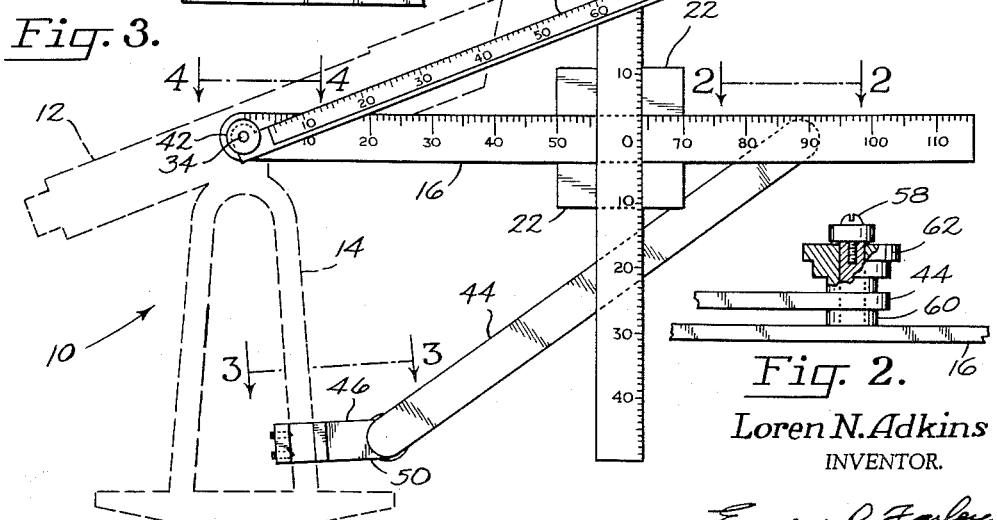
Fig. 2.
Fig. 1.
Loren N. Adkins
INVENTOR.
BY Eugene R. Farley
Atty.

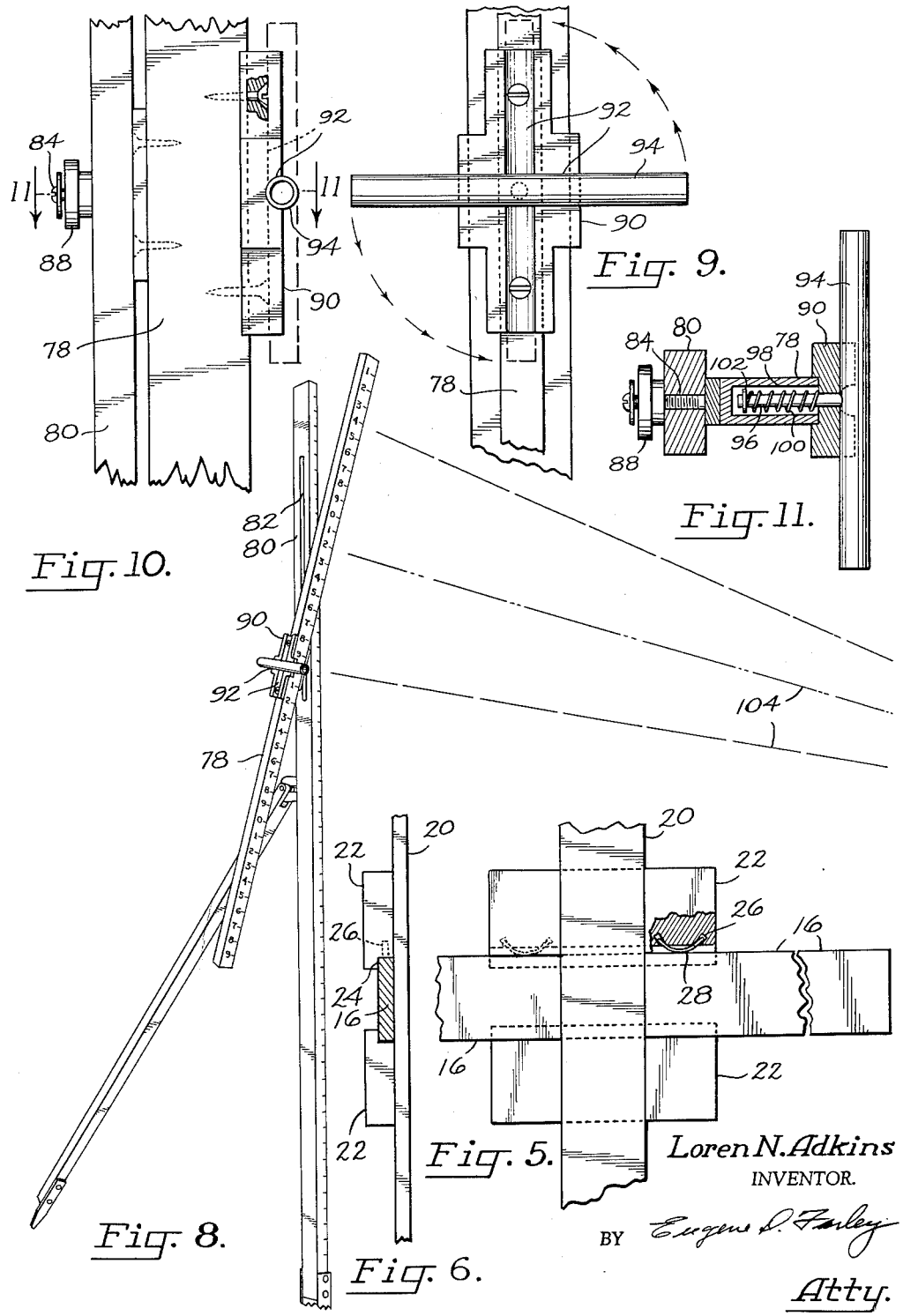

United States Patent Office 3,019,531
Patented Feb. 6, 1962

3,019,531
SCALE REDUCING DEVICE FOR
SIGHTING INSTRUMENTS
Loren N. Adkins, P.O. Box 1054, Juneau, Alaska
Filed Nov. 7, 1958, Ser. No. 772,530
3 Claims. (Cl. 33—67)

This invention relates to a scale reducing device for use with sighting instruments, and although such device is illustrated herein in conjunction with a surveyor's transit utilizing a stadia reading scope it is to be understood that it may also be used with other instruments.

The conventional method of running a stadia survey is to sight on a vertically-held stadia or level rod and read the rod intercept or stadia interval with the center stadia hair of the transit bearing on the stadia rod at the height of the transit. The inclination angle is then read, and with such readings, i.e., the inclination angle and the rod intercept necessary values such as vertical and horizontal distances can be had by computation or by the use of tables, diagrams, or special slide rules.

The determination of desired distances by computation or by the other methods mentioned above leads to frequent errors, such errors principally arising from the misreading of tables, charts or slide rules and also in the transferring of figures to and from such tables or the like.

It is therefore a principal object of the present invention to provide a scale reducing device for sighting instruments which simplifies the process of determining locations, areas, or volumes.

It is another object to provide a scale reducing device for sighting instruments which eliminates the necessity of various computations or the use of tables or the like to determine desired values and thereby reduce possibility of error in arriving at such values.

More specifically it is an object to provide a device of the type described having scale means thereon whereby when the device is mounted on a sighting instrument direct values which conventionally must be computed by tables etc. are ascertainable at the instrument, and furthermore there exists at the instrument upon setting of the scale means a geometrical configuration of a cut or fill.

It is another object to provide a scale reducing device of the type described which is easily operated by a surveyor without detailed learning instructions.

A further object is to provide a stadia rod structure having improved means for positioning the rod at right angles to the line of sight.

The manner in which the objects of this invention are accomplished will be apparent from the accompanying specification and claims considered together with the drawings wherein:

FIG. 1 is a side elevational view of one form of the present scale reducing device;

FIG. 2 is a fragmentary plan view with parts broken away showing connecting structure between a scale member and brace means, taken on the line 2—2 of FIG. 1;

FIG. 3 is a fragmentary plan view with parts broken away of connecting structure between the brace means and a sighting instrument on which it is mounted, taken on the line 3—3 of FIG. 1;

FIG. 4 is a fragmentary plan view with parts broken away of mounting structure for a pair of scale members on the instrument, taken on the line 4—4 of FIG. 1;

FIG. 5 is a fragmentary elevational view of a vertical scale member showing means for mounting such scale on another scale member;

FIG. 6 is a fragmentary end view of the structure of FIG. 5;

FIG. 7 is a side elevational view of a second form of the invention;

FIG. 8 is a perspective view of a stadia rod assembly including an improved auxiliary stadia rod;

FIG. 9 is a fragmentary elevational view of peepsight means on the auxiliary stadia rod;

FIG. 10 is a fragmentary side elevational view of the structure of FIG. 9; and

FIG. 11 is a sectional view taken on the line 11—11 of FIG. 10.

Generally stated, the invention comprises an assemblage of a plurality of scale members capable of being mounted on a sighting instrument and capable of showing direct values on the scales to eliminate certain computations as mentioned hereinbefore. In another form of the invention the scale members include a plate having a grid face and slope designations thereon wherein various functions can be determined directly from the scale rather than having to compute them. Also comprising a part of the present invention is an auxiliary stadia rod having peepsight means capable of positioning the auxiliary rod perpendicular to the inclined line of sight.

Considering the foregoing in greater detail and with particular reference to the drawing:

The present scale reducing device is especially adaptable for use with a transit 10, FIGURES 1 and 7, employing a scope 12 pivotally mounted on a frame 14. A stadia instrument of this type employs two or three stadia hairs, not shown, by means of which a straightline distance from the scope to a stadia rod can be determined by reading the rod intercept.

Referring first to the embodiment of FIG. 1, the scale reducing device of this embodiment comprises a horizontal stationary arm 16, an arm 18 parallel to the scope and pivotal therewith, and a vertical arm 20 slidable on arm 16. Each of the arms 16, 18 and 20 has similar scale indicia and form a triangular configuration whereby upon obtaining a reading on one of the scales readings on other sides of the triangle represent accurate distances in such directions.

Vertical arm 20 is slidably mounted on horizontal arm 16 by means of a pair of plates 22, FIGS. 1, 5 and 6, secured in spaced relation to the back side of the arm 20 and having complementary grooves 24 for receiving the arm 16. The upper plate 22 has pairs of apertures 26, FIG. 5, for receiving the opposite ends of flexed leaf springs 28 which bear on the upper edge of the arm 16 to provide a frictional grip thereon. The springs 28 provide adjustable set positions of the arm 20 on the arm 16.

Referring now to FIG. 4 the two arms 16 and 18 are mounted on the scope pivot shaft 30 and for this purpose the end of this shaft is tapped to threadedly receive a screw or adapter member 32. Screw 32 has an extended threaded shank 34 carrying a pair of integral spaced heads or collars 36 between which is disposed a spacer 38. A nut 40 is threaded on the shank 34 of screw 32. Screw 32 rotates with the scope shaft 30, and when the nut 40 is tightened securely against the arm 18, such arm rotates with the scope.

Arm 16 is supported in a horizontal position by an inclined brace 44 connected at one end to the transit frame 14 and at its other end to the outer portion of the arm 16. The connection to the transit, shown in FIG. 3, comprises a clamp member 46 fixed to a member of the transit frame 14 by set screws 48. The clamp 46 has an apertured projecting finger 50 pivotally mounted on the head of a screw 52 integrally secured to the lower end of brace 44. A nut 56 is threaded on screw 52, and upon tightening this nut the clamp 46 and brace 44 are locked together in non-rotating relationship to form a rigid support for the horizontal arm 16.

The opposite end of the brace 44 is apertured and is pivoted on a screw 58, FIG. 2, threaded in a washer 60 integrally secured to the back side of arm 16. A nut 62 is threaded on the screw 58 and is adapted to be tightened on the brace to provide a non-rotative rigid connection between the brace 44 and arm 16. The washer 60 spaces the brace 44 from the arm 16 so that the plates 22 on the vertical arm 20 can slide thereby.

In mounting the present device on a transit, the arms 16 and 18 are supported by the scope shaft as explained hereinbefore and the clamp 46 mounted on the frame member. With the nuts at opposite ends of the brace 44 and on the screw 34 in a loose condition the arm 16 can be leveled by locating the clamp 46 in the proper vertical position on the transit frame, whereby this arm is parallel to the upper plate of the transit which in operation of the transit is adjusted to a horizontal plane. With the connections tightened the arm 16 is stationary in its horizontal plane, and the arm 18 rotates with the scope. The head 36 associated with arm 16 forms a shaft for such arm for rotation thereof to a selected fixed position.

In operation of the present invention, upon determining a rod intercept from the scope, for example, an intercept of 68 feet, the vertical slide is moved horizontally so as to position its scaled edge at 68, as shown in FIGURE 1, the arm 18 being left in the angular position determined by the line of sight of the scope. Thereby, the horizontal distance for the triangle illustrated having an hypotenuse of 68 feet can be read from the scale on arm 16 and the vertical distance from the scale on arm 20.

The form of the invention shown in FIG. 7 is similar to that of FIG. 1 except that in the FIG. 7 embodiment the horizontal sliding scale member comprises a plate 64. This plate has an upright scale 66 for use with the other scales on arms 16 and 18 as explained hereinbefore in connection with the first embodiment and also has a grid face surface 68 and slope lines 70 which permit the operator to set slope stakes without computation. Although only a portion of the face of plate 64 is shown with the closely spaced grid lines, it is preferred to have the entire face so marked. Plate 64 is slidably mounted on the arm 16 in a manner similar to the arm 20 of FIG. 1, i.e., by a pair of plates, not shown, having grooves to receive the arm 16. Plate 64 is apertured at 72 throughout a greater portion of its width so that the scale on arm 16 can be read therethrough.

One function of the plate 64 of FIG. 7 is to establish the location of a slope stake point where the slope incline, the distance from the center of the right of way to the slope bottom at grade level, and the distance between the ground line and the grade at the transit are known. With the transit set on the center line of the right of way the plate 64 is first set with its zero or left hand edge at a reading representing the known distance from the center line to the bottom of the slope at grade level. As the transit point is above the grade level the geometry of the scale reducer must be corrected to that location. This is accomplished by reading up the left edge of plate 64 the distance the ground is above grade and then moving horizontally at this reading to the point of intersection with the given slope line. Thereupon a reading is taken on the horizontal scale at a point vertically below such intersection and the plate is moved to the right to set the left-hand edge at this reading. Such reading on the scale 16 comprises the horizontal distance from the ground at the center line of the right of way to the slope.

With such positioning of the plate 64, the scale reducing device is thereby set up geometrically so that the slope distance is read on the stadia rod and measured on the rotating scale, the point of intersection of the scale on arm 18 and the slope line being the staking point. Such staking point obviously then is the horizontal distance as measured on the fixed horizontal arm 16 and the vertical distance is the sum of the original distance above grade and the distance indicated on the arm 18.

Referring now to FIGS. 8 through 11 there is shown an improved stadia rod assembly comprising an auxiliary rod 78 for use with a support rod or standard 80 having a vertical slot 82. Slidable vertically in the slot 82 is a bolt 84, FIG. 11, integrally fixed to the auxiliary rod 78, the bolt 84 having a nut 86 threaded on the opposite side of the rod 80 from the auxiliary rod 78 so as to clamp these two members together in an angular set position when desired but otherwise permitting relative rotation of these two members.

Integrally mounted on the outer edge of the auxiliary stadia rod 78 is a plate 90 having a pair of grooves 92 extending at right angles to each other. Engageable with these grooves is a tubular peepsight 94 open at its ends and having an integral right angular pin 96 extending through the plate 90 and into an aperture 98 in the auxiliary stadia rod 78. The peepsight 94 may have a stadia hair therein if desired to increase the accuracy thereof. A spring 100 is carried on the pin 96 and is compressed between the plate 90 and an abutment washer 102 on the end of the pin. This spring pressed pin 96 thereby firmly keeps the peepsight 94 in one or the other of the grooves 92 to provide either a sighting position or a folded position. In the sighting position of this sight it is disposed at right angles to the rod 78 and is adapted to position the auxiliary stadia rod at right angles to the line of sight. In its folded position the peepsight is parallel with the auxiliary stadia bar to be in an out of the way position.

Thereby in accordance with the present invention a scale reducing device is adapted to be mounted on a transit to facilitate the determination of desired values and to reduce the chance for error in the reading of numerals in tables or the like or the transferring of numerals to the tables. Also, the device, by means of the slope plate 64, can be used to locate slope stakes either above or below grade level. In addition, direct readings are available on the tiltable stadia rod 78 which is capable of movement to a position normal to the line of sight and located in such normal position by means of the peepsight 94.

Also, by means of the present titltable stadia rod the scope can be positioned, in a sighting operation, whereby the lower hair is on the center of the rotating stadia rod. FIGURE 8 shows three sight lines 104, with the lower one of these lines on the center of the stadia rod. Such sight method provides an improvement over conventional methods. That is, the conventional stadia procedure is to set the lower hair on some even foot mark and read the stadia interval in terms of feet and tenths as indicated on the upper hair; then record this interval plus the added instrument correction, if any. The scope is then adjusted until its middle hair is on the height of instrument of the transit and then the vertical angle or angular corrections can be read and recorded for computation purposes.

With the present device, the angular displacement from the middle to the lower hair is taken care of in the initial setting of the rotating bar. The instrument correction is taken care of, making the zero setting for the lower hair be the correction amount above the center of rotation of the stadia rod. The vertical angle is corrected for by having the stadia rod rotated until it is at right anglse to the line of sight.

It is to be understood that the forms of my invention herewith shown and described are to be taken as preferred examples of the same and that various other changes in the shape, size and arrangement of parts may be resorted to without departing from the spirit of the invention or the scope of the subjoined claims.

Having thus described my invention, I claim:

1. A scale device adapted to be mounted on a stadia sighting instrument assembly having an upright frame member, a leveling plate, a scope, and a scope mounting shaft rotatably mounting the scope on the frame member, comprising a first scale member, means adapted to secure the first scale member to the scope shaft in parallel relation with the scope and rotatable therewith, a stationary second scale member, means adapted to mount one end of the second scale member on the scope shaft, angular brace means, means connecting one end of the brace means to the outer end of the second scale member, clamp means on the other end of the brace means adapted to be secured to the upright instrument frame member at a selected height location for positioning the second scale member in a stationary position parallel to the leveling plate, and a third scale member the third scale member being normal to the second scale member slidably mounted on the second scale member and intersecting the first scale member, the scale members cooperating to indicate readings and forming together a triangular configuration similar to a triangle defined by the line of sight of the scope and the horizontal and vertical projections of that line.

2. A stadia sighting instrument assembly comprising an upright frame, a leveling plate, a pivotal scope shaft on the frame having an end projection, a scope secured to the shaft for rotation therewith, a first scale member mounted on the shaft projection, means clamping securely the first scale member on the shaft projection for rotation therewith, a stationary second scale member, means mounting one end of the second scale member on the shaft projection, an angular brace, means connecting one end of the brace to the outer end of the second scale member, clamp means on the other end of the brace connecting said end to the frame at a selected height location for positioning the second scale member in a stationary position parallel to the leveling plate, and a third scale member slidably mounted on the second scale member, the third scale member being normal to the second scale member and intersecting the first scale member, the scale members cooperating to indicate readings and forming together a triangular configuration similar to a triangle defined by the line of sight of the scope and the horizontal and vertical projections of that line.

3. A stadia rod assembly for use with a sighting instrument comprising an upright support rod, an auxiliary rod pivotally mounted along one side of the support rod for vertical tilting relative to the latter, a face on the auxiliary rod having scale indicia thereon, a latch plate secured to the auxiliary rod for pivotal movement therewith, the latch plate having a side surface provided with a first groove parallel with the auxiliary rod and a second groove disposed at right angles to the first groove and intersecting the latter, a tubular peepsight, and spring pressed means mounting the peepsight on the latch plate for rotation in a plane parallel to the side surface of the latch plate between a pair of latched positions in the first and second grooves comprising a folded position parallel to the rod and a sighting position normal to the face of the rod respectively.

References Cited in the file of this patent

UNITED STATES PATENTS

| | | |
|---|---|---|
| 190,782 | Robbins | May 15, 1877 |
| 313,659 | Dolman | Mar. 10, 1885 |
| 1,048,718 | McCormick | Dec. 31, 1912 |
| 1,443,390 | Smith | Jan. 30, 1923 |
| 2,113,272 | Johnson | Apr. 5, 1938 |

FOREIGN PATENTS

| | | |
|---|---|---|
| 635,805 | Great Britain | Apr. 19, 1950 |